May 3, 1938.  B. E. SHAW  2,116,002
REFRIGERATING SYSTEM
Filed Oct. 15, 1936  2 Sheets-Sheet 1
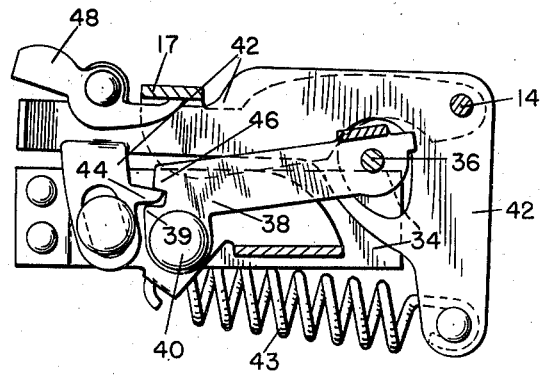
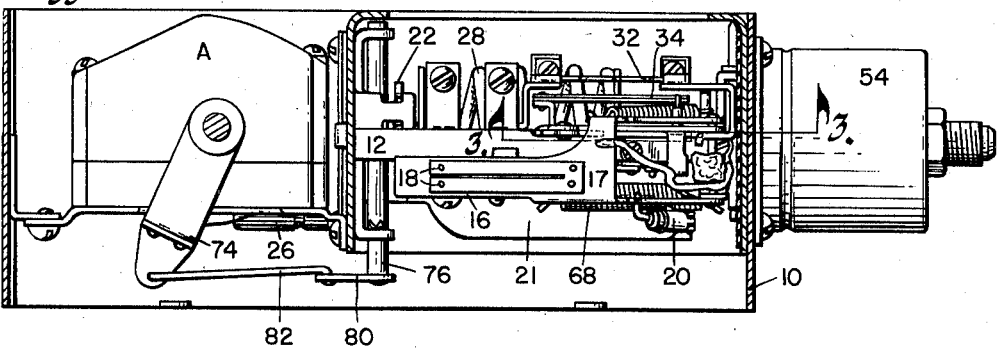
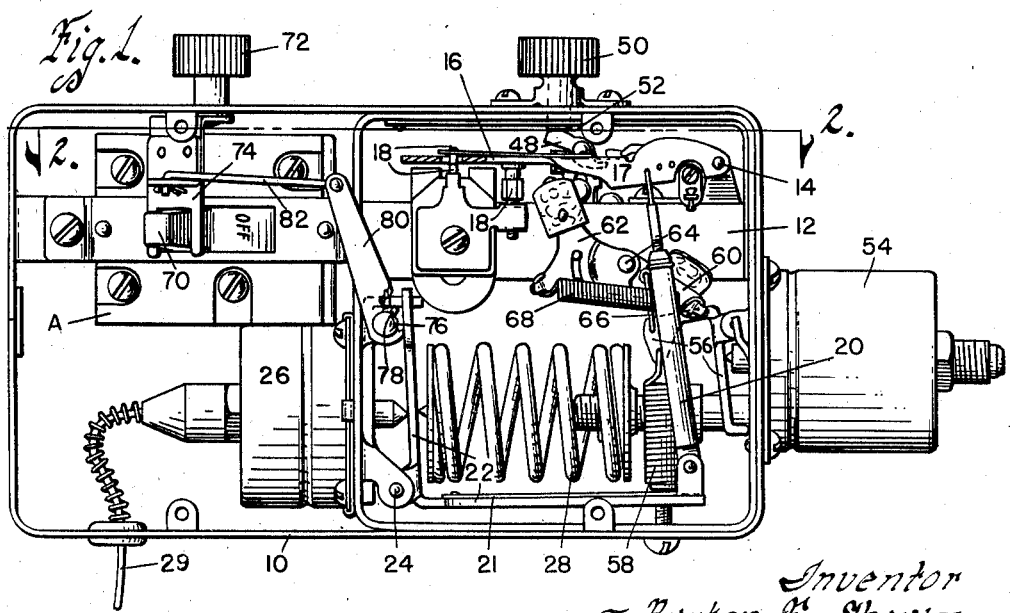
Inventor
Burton E. Shaw
by Bair, Freeman & Sinclair
Attorneys
Witness
N. S. Wenzenmaier May 3, 1938.  B. E. SHAW  2,116,002
REFRIGERATING SYSTEM
Filed Oct. 15, 1936  2 Sheets-Sheet 2
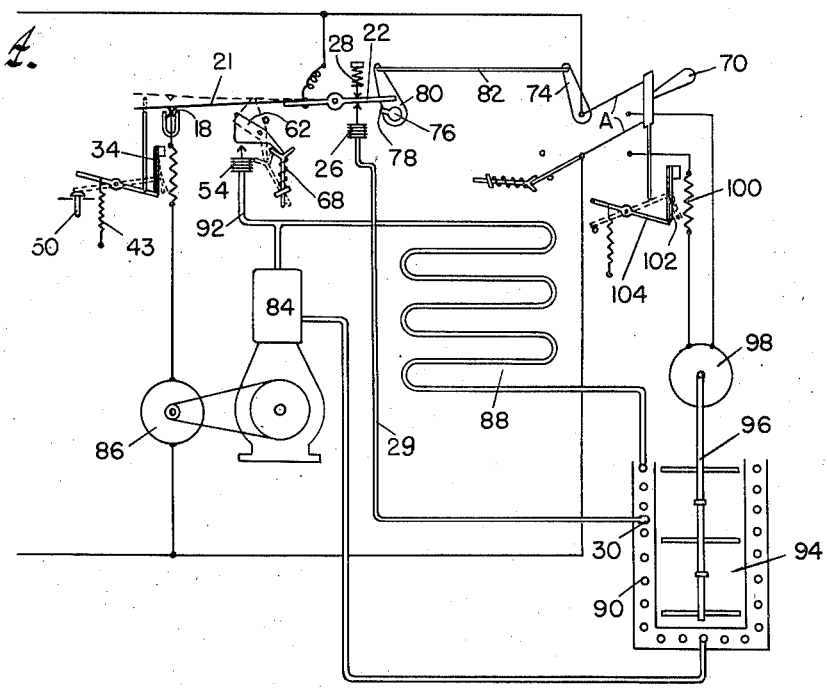
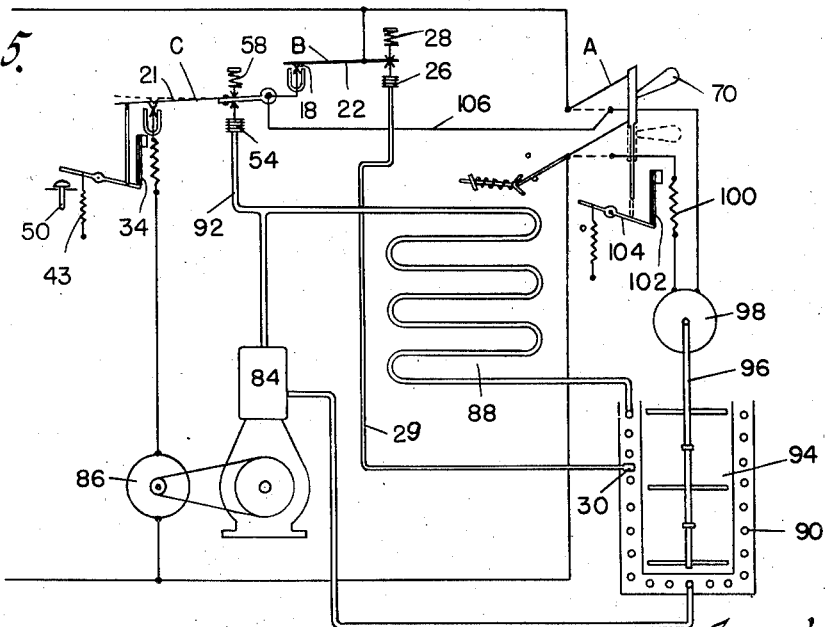
Inventor
Burton E. Shaw
by Bair, Freeman & Sinclair
Attorneys
Witness
H. S. Munzenmaier Patented May 3, 1938

2,116,002

UNITED STATES PATENT OFFICE 2,116,002

REFRIGERATING SYSTEM

Burton E. Shaw, Adel, Iowa, assignor to Penn Electric Switch Co., Des Moines, Iowa, a corporation of Iowa Application October 15, 1936, Serial No. 105,683

22 Claims. (Cl. 62—4)

An object of my present invention is to provide a refrigerating system in which a freezer compartment can be automatically maintained at a predetermined temperature and manually set for being dropped to a lower temperature when a new batch of cream or the like to be frozen is placed therein, the system being comparatively simple and inexpensive from a manufacturing standpoint.

A further object is to provide in connection with a batch freezer and an agitator therefor, a motor which may be energized by a manually controlled switch, the switch effecting continuous operation of a refrigerant compressor while the agitator motor is in operation.

A further object is to provide mechanical means and an equivalent electrical means in a modified form of construction for causing the refrigerant compressor to operate continuously, this being accomplished automatically whenever the switch for the freezer agitator motor is manually moved to closed circuit position.

A further object is to provide controls of this character which, in addition to accomplishing the results above outlined, still permit the automatic operation of safety features, such as overload protecting devices and excessive refrigerant pressure responsive devices.

Another object is to provide an automatic switch for a refrigerating mechanism and a manual switch for a freezer motor, the manual switch being connected either mechanically or electrically with the automatic control switch to render it ineffective in its automatic capacity, while the freezer motor is in operation, with the exception of automatic safety devices still being operable to control the refrigerating mechanism.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 is a front elevation of a control switch used in connection with my refrigerating system.

Figure 2 is a sectional view on the line 2—2 thereof.

Figure 3 is an enlarged sectional view on the line 3—3 of Figure 2.

Figure 4 is a diagrammatical view showing the system in control of the switch illustrated in Figures 1, 2, and 3; and Figure 5 is a diagrammatical view of a modified form of construction in which an electrical interconnection between control switches is provided rather than a mechanical one, as shown in Figure 4.

On the accompanying drawings, I have used the numeral 10 to indicate generally a housing. Within the housing 10, a support 12 is provided which carries a pivot pin 14. An armature 16 is pivoted to the pin 14 and is provided with contacts 18 for controlling an electric circuit. The armature 16 is controlled automatically by a link 20 connected with a bell crank 22. The bell crank 22 is pivoted at 24 and is operated automatically by a pressure bellows 26 opposed by an adjusting spring 28. The bellows 26 has a capillary tube connection 29 with a temperature responsive bulb 30.

An overload safety device is provided for the switch contacts 18 and comprises the following elements: A resistance heater 32; a bimetal latch 34 responsive to the temperature thereof; a latch pin 36 carried by a latch lever 38 pivoted at 40; and a trip lever 42 pivoted on the pin 14.

The trip lever 42 has a latch lug 44 cooperating with a latch lug 46 on the latch lever 38, and has pivoted to it a reset lever 48. For resetting purposes a reset knob 50 is provided having a pin 52 for operating the reset lever 48.

A safety device for excess pressure in the high side of a refrigerating system is provided for the switch arm 16 and comprises the following elements: A pressure bellows 54; a lever 56 operated thereby and opposed by a spring 58; a primary over-center lever 60 and a secondary over-center lever 62 both pivoted on a pin 64; a link connection 66 between the lever 56 and the lever 60; and an over-center spring 68.

In my controller I provide a manual switch A which is an "off" and "on" snap switch, the operating handle thereof being indicated at 70. The switch A is mounted within the housing 10 and may be controlled from the outside of the housing by a control knob 72 connected with a forked lever 74, the forked end of which straddles the operating handle 70. The lever 74 is effective to modify the action of the bell crank 22 through the medium of a rock shaft 76 having a projection 78 adapted to engage the lever 22 and hold it in closed circuit position when the switch A is adjusted to "on" position. This is accomplished by connecting the rock shaft 76 with the lever 74 by means of a lever 80 on the rock shaft, and a link connection 82 between the levers 74 and 80. The switch A is fully disclosed in Patent No. 2,051,943, issued August 25, 1936.

Referring to Figure 4, a refrigerant compressor 84 is illustrated driven by a motor 86. The condenser coil of the refrigerating system is indicated at 88 and the evaporator thereof at 90. The contacts 18 it will be noted are connected in the circuit of the motor 86. The bulb 30 is arranged adjacent the evaporator 90 so as to be responsive to the temperature produced thereby. The safety bellows 54 is connected by tubing or the like 92 to the high pressure side of the refrigerant compressor. A compartment 94 is associated with the evaporator 90 to be chilled thereby, and an agitator 96 for the contents of the compartment is provided.

A freezer motor 98 operates the agitator 96 and is controlled by the switch A. The switch A includes an overload feature shown diagrammatically in Figure 4 and comprises a resistance heater 100 in the circuit of the motor 98, a bimetal latch 102 and a lever 104 latched thereby and adapted to open the switch A whenever the lever 104 is unlatched.

In Figure 5 I have shown a modification in which individual switches B and C control the motor 86. The switch B is responsive to the temperature of the bulb 30 only, while the switch C may be operated to break the circuit either by the safety bellows 54 or the overload bimetal latch 34. The switch A is the same, and an additional wire indicated at 106 is utilized to provide a connection with the switch A, which causes the switch A, when closed, to shunt the switch B out of the circuit.

Thus with the form of invention shown in Figure 4, the control switch for the motor 86 is mechanically retained in closed circuit position, while, as disclosed in Figure 4, the switch B for automatically controlling the refrigerant compressor 84 in response to the temperature produced by the evaporator 90 is shunted so that even when it is open, the circuit for the motor 86 will be maintained as long as the switch A is closed.

*Practical operation*

In the operation of the system shown in Figure 4, with the parts in the position illustrated by full lines, the refrigerant compressor 84 is being operated and is automatically controlled by the temperature responsive bulb 30. This is desirable in ice cream plants and the like where between batches the compartment 94 should be kept at a predetermined low temperature. When a batch of cream is put in the compartment 94 for freezing, in order to effect quick freezing, it is desirable to run the refrigerant compressor continuously.

A switch must be provided for the agitator motor 98 so that it can be energized when a new batch of cream is placed in the compartment 94. By the mechanical connection, consisting of the levers 74 and 80, the link 82, the rock shaft 76 and its cam 78, when the switch A is closed, the bell crank 22 is held in closed circuit position. Thus the refrigerant compressor 84 will continue to operate as long as the switch A is closed regardless of the low temperature of the bulb 30 tending to move the bell crank 22 to open circuit position.

It is desirable, however, that the overload and high pressure safety devices operate to break the circuit through the motor 86 in the event of either an overload in the circuit or excessive high pressure on the high side of the refrigerant compressor 84.

The link 20 of the switch shown in Figure 1 is, therefore, connected by a leaf spring 21 to the lever 22 so that as illustrated in Figure 4, the bimetal 34 can unlatch or the bellows 54 trip the over-center lever 62 in a clockwise direction, all as shown by dotted lines in Figures 4, thus separating the contacts 18.

The lever 62, when swung in a clockwise direction, engages a cross bar 17 of the armature 16 to move it upwardly. If an overload in the circuit of the motor 86 occurs, the right hand end of the bimetal lever 34 in Figure 2 warps upwardly, thus releasing the latch pin 36 so that a spring 43 (see Figure 3) can swing the trip lever 42 in a clockwise direction to cause the reset lever 48 to engage the cross bar 17. Releasing the latch pin 36 permits the right hand end of the latch lever 38 to drop and release the latch lug 44 of the trip lever 42 for this purpose.

To reset the switch after an overload has occurred, the reset knob 50 is depressed for pushing the reset lever 48 downwardly and thereby swinging the trip lever 42 against the action of the spring 43. The latch lug 44 thereupon engages a corner 39 of the latch lever 38 to lift the latch pin 36 to relatched position.

With the construction shown in Figure 5, the operation is the same except that instead of the switch A holding the bell crank 22 in closed circuit position, the switch B is shunted out of the circuit as long as the switch A is in closed circuit position.

With both forms of the invention, the overload mechanism 100, 102 and 104 associated with the switch A is operable to open this switch when the batch being agitated by the agitator 96 is frozen to the desired degree, and therefore so stiff that it throws an overload on the motor 98. With either system it is obvious that the desired control is had including a positive operation of the refrigerant compressor 84, while the switch A is closed except when either of the overload devices or the high pressure safety device operates. The circuit for the motor 86 is then broken.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a refrigerating system, a refrigerant compressor, a motor for driving said compressor, an evaporator cooled by said compressor, a switch in control of the circuit for said motor and responsive to a predetermined low temperature produced by said evaporator to open said circuit, a freezer compartment associated with said evaporator to be chilled thereby, an agitator in said freezer compartment, a freezer motor for operating said agitator, means for controlling said freezer motor comprising a second switch in control of the circuit therefor and means rendered operable by said second switch while it is in closed circuit position for positively retaining said first motor energized beyond said predetermined low temperature produced by said evaporator.

2. In a refrigerating system, a refrigerant compressor, a motor for driving said compressor, an evaporator cooled by said compressor, a switch in control of the circuit for said motor and responsive to a predetermined low temperature produced by said evaporator to open said circuit, means in the circuit of said motor and responsive to an overload therein for opening said circuit, a freezer compartment associated with said evaporator to be chilled thereby, an agitator in said freezer compartment, a freezer motor for operating said agitator, means for controlling said freezer motor comprising a second switch in control of the circuit therefor and means rendered operable by said second switch while it is in closed circuit position for positively retaining said first motor energized beyond its normal cut-off in response to said predetermined low temperature produced by said evaporator except upon an overload in the circuit thereof.

3. In a refrigerating system, a refrigerant compressor, a motor for driving said compressor, an evaporator cooled by said compressor, a switch in control of the circuit for said motor and responsive to a temperature produced by said evaporator, a freezer compartment associated with said evaporator to be chilled thereby, an agitator in said freezer compartment, a freezer motor for operating said agitator, means for controlling said freezer motor comprising a second switch in control of the circuit therefor, means in the circuit of said freezer motor and responsive to an overload therein for opening the freezer motor circuit and means rendered operable by said second switch while it is in closed circuit position only for retaining said first motor energized regardless of the temperature produced by said evaporator.

4. In a refrigerating system, a refrigerant compressor, a motor for driving said compressor, an evaporator cooled by said compressor, a switch in control of the circuit for said motor and responsive to a temperature produced by said evaporator, means responsive to the high side pressure of said refrigerant compressor for opening the circuit of said motor upon excess pressure being generated, a freezer compartment associated with said evaporator to be chilled thereby an agitator in said freezer compartment, a freezer motor for operating said agitator, means for controlling said freezer motor comprising a second switch in control of the circuit therefor and means rendered operable by said second switch while it is in closed circuit position for retaining said first motor energized regardless of the temperature produced by said evaporator except upon the generation of excess pressure in the high side of the refrigerant compressor.

5. In a refrigerating system, a refrigerant compressor, a motor for driving said compressor, an evaporator cooled by said compressor, a switch in control of the circuit for said motor and responsive to a temperature produced by said evaporator, means in the circuit of said motor and responsive to an overload therein for opening said circuit, a freezer compartment associated with said evaporator to be chilled thereby, an agitator in said freezer compartment, a freezer motor for operating said agitator, means for controlling said freezer motor comprising a second switch in control of the circuit therefor, means in the circuit of said freezer motor and responsive to an overload therein for opening the freezer motor circuit and means rendered operable by said second switch while it is in closed circuit position only for retaining said first motor energized regardless of the temperature produced by said evaporator except upon an overload in the circuit thereof.

6. In a refrigerating system, a refrigerant compressor, a motor for driving said compressor, an evaporator cooled by said compressor, a switch in control of the circuit for said motor and responsive to a temperature produced by said evaporator, means in the circuit of said motor and responsive to an overload therein for opening said circuit, means responsive to the high side pressure of said refrigerant compressor for opening the circuit of said motor upon excess pressure being generated, a freezer compartment associated with said evaporator to be chilled thereby, an agitator in said freezer compartment, a freezer motor for operating said agitator, means for controlling said freezer motor comprising a second switch in control of the circuit therefor and means rendered operable by said second switch while it is in closed circuit position for retaining said first motor energized regardless of the temperature produced by said evaporator except upon an overload in the circuit thereof and except upon the generation of excess pressure in the high side of the refrigerant compressor.

7. In a refrigerating system, a refrigerant compressor, a motor for driving said compressor, an evaporator cooled by said compressor, a switch in control of the circuit for said motor and responsive to a temperature produced by said evaporator, means responsive to the high side pressure of said refrigerant compressor for opening the circuit of said motor upon excess pressure being generated, a freezer compartment associated with said evaporator to be chilled thereby, an agitator in said freezer compartment, a freezer motor for operating said agitator, means for controlling said freezer motor comprising a second switch in control of the circuit therefor, means in the circuit of said freezer motor and responsive to an overload therein for opening the freezer motor circuit and means rendered operable by said second switch while it is in closed circuit position only for retaining said first motor energized regardless of the temperature produced by said evaporator except upon the generation of excess pressure in the high side of the refrigerant compressor.

8. In a refrigerating system, a refrigerant compressor, a motor for driving said compressor, an evaporator cooled by said compressor, a switch in control of the circuit for said motor and responsive to a temperature produced by said evaporator, means in the circuit of said motor and responsive to an overload therein for opening said circuit, means responsive to the high side pressure of said refrigerant compressor for opening the circuit of said motor upon excess pressure being generated, a freezer compartment associated with said evaporator to be chilled thereby, an agitator in said freezer compartment, a freezer motor for operating said agitator, means for controlling said freezer motor comprising a second switch in control of the circuit therefor, means in the circuit of said freezer motor and responsive to an overload therein for opening the freezer motor circuit, and means rendered operable by said second switch while it is in closed circuit position only for retaining said first motor energized regardless of the temperature produced by said evaporator except upon an overload in the circuit thereof and except upon the generation of excess pressure in the high side of the refrigerant compressor.

9. In a refrigerating system, a refrigerant compressor, a motor for driving said compressor, an evaporator cooled by said compressor, a switch in control of the circuit for said motor and responsive to a temperature produced by said evaporator, a freezer compartment associated with said evaporator to be chilled thereby, an agitator in said freezer compartment, a freezer motor for operating said agitator, means for controlling said freezer motor comprising a second switch in control of the circuit therefor and means rendered operable by said second switch while it is in closed circuit position for retaining said first motor energized regardless of the temperature produced by said evaporator, said means rendered operable by said second switch comprising an element movable by said second switch to a position of obstruction relative to said first switch to retain it in closed circuit position.

10. In a refrigerating system, a refrigerant compressor, a motor for driving said compressor, an evaporator cooled by said compressor, a switch in control of the circuit for said motor and responsive to a temperature produced by said evaporator, means in the circuit of said motor and responsive to an overload therein for opening said circuit, a freezer compartment associated with said evaporator to be chilled thereby, an agitator in said freezer compartment, a freezer motor for operating said agitator, means for controlling said freezer motor comprising a second switch in control of the circuit therefor and means rendered operable by said second switch while it is in closed circuit position for retaining said first motor energized regardless of the temperature produced by said evaporator, said means rendered operable by said second switch comprising an element moved by said second switch to a position of obstruction relative to said first switch to retain it in closed circuit position except upon an overload in the circuit thereof.

11. In a refrigerating system, a refrigerant compressor, a motor for driving said compressor, an evaporator cooled by said compressor, a switch in control of the circuit for said motor and responsive to a temperature produced by said evaporator, a freezer compartment associated with said evaporator to be chilled thereby, an agitator in said freezer compartment, a freezer motor for operating said agitator, means for controlling said freezer motor comprising a second switch in control of the circuit therefor, means in the circuit of said freezer motor and responsive to an overload therein for opening the freezer motor circuit and means rendered operable by said second switch while it is in closed circuit position only for retaining said first motor energized regardless of the temperature produced by said evaporator, said means rendered operable by said second switch comprising an element moved by said second switch to a position of obstruction relative to said first switch to retain it in closed circuit position.

12. In a refrigerating system, a refrigerant compressor, a motor for driving said compressor, an evaporator cooled by said compressor, a switch in control of the circuit for said motor and responsive to a temperature produced by said evaporator, means responsive to the high side pressure of said refrigerant compressor for opening the circuit of said motor upon excess pressure being generated, a freezer compartment associated with said evaporator to be chilled thereby, an agitator in said freezer compartment, a freezer motor for operating said agitator, means for controlling said freezer motor comprising a second switch in control of the circuit therefor and means rendered operable by said second switch while it is in closed circuit position for retaining said first motor energized regardless of the temperature produced by said evaporator, said means rendered operable by said second switch comprising an element moved by said second switch to a position of obstruction relative to said first switch to retain it in closed circuit position except upon the generation of excess pressure in the high side of the refrigerant compressor.

13. In a refrigerating system, a refrigerant compressor, a motor for driving said compressor, an evaporator cooled by said compressor, a switch in control of the circuit for said motor and responsive to a temperature produced by said evaporator, means in the circuit of said motor and responsive to an overload therein for opening said circuit, a freezer compartment associated with said evaporator to be chilled thereby, an agitator in said freezer compartment, a freezer motor for operating said agitator, means for controlling said freezer motor comprising a second switch in control of the circuit therefor, means in the circuit of said freezer motor and responsive to an overload therein for opening the freezer motor circuit and means rendered operable by said second switch while it is in closed circuit position only for retaining said first motor energized regardless of the temperature produced by said evaporator, said means rendered operable by said second switch comprising an element moved by said second switch to a position of obstruction relative to said first switch to retain it in closed circuit position except upon an overload in the circuit thereof.

14. In a refrigerating system, a refrigerant compressor, a motor for driving said compressor, an evaporator cooled by said compressor, a switch in control of the circuit for said motor and responsive to a temperature produced by said evaporator, means in the circuit of said motor and responsive to an overload therein for opening said circuit, means responsive to the high side pressure of said refrigerant compressor for opening the circuit of said motor upon excess pressure being generated, a freezer compartment associated with said evaporator to be chilled thereby, an agitator in said freezer compartment, a freezer motor for operating said agitator, means for controlling said freezer motor comprising a second switch in control of the circuit therefor and means rendered operable by said second switch while it is in closed circuit position for retaining said first motor energized regardless of the temperature produced by said evaporator, said means rendered operable by said second switch comprising an element moved by said second switch to a position of obstruction relative to said first switch to retain it in closed circuit position, except upon an overload in the circuit thereof and except upon the generation of excess pressure in the high side of the refrigerant compressor.

15. In a refrigerating system, a refrigerant compressor, a motor for driving said compressor, an evaporator cooled by said compressor, a switch in control of the circuit for said motor and responsive to a temperature produced by said evaporator, means responsive to the high side pressure of said refrigerant compressor for opening the circuit of said motor upon excess pressure being generated, a freezer compartment associated with said evaporator to be chilled thereby, an agitator in said freezer compartment, a freezer motor for operating said agitator, means for controlling said freezer motor comprising a second switch in control of the circuit therefor, means in the circuit of said freezer motor and responsive to an overload therein for opening the freezer motor circuit and means rendered operable by said second switch while it is in closed circuit position only for retaining said first motor energized regardless of the temperature produced by said evaporator, said means rendered operable by said second switch comprising an element moved by said second switch to a position of obstruction relative to said first switch to retain it in closed circuit position except upon the generation of excess pressure in the high side of the refrigerant compressor.

16. In a refrigerating system, a refrigerant compressor, a motor for driving said compressor, an evaporator cooled by said compressor, a switch in control of the circuit for said motor and responsive to a temperature produced by said evaporator, a freezer compartment associated with said evaporator to be chilled thereby an agitator in said freezer compartment, a freezer motor for operating said agitator, means for controlling said freezer motor comprising a second switch in control of the circuit therefor and means rendered operable by said second switch while it is in closed circuit position for retaining said first motor energized regardless of the temperature produced by said evaporator, said means rendered operable by said second switch comprising a shunt circuit through said second switch and shunting the first switch.

17. In a refrigerating system, a refrigerant compressor, a motor for driving said compressor, an evaporator cooled by said compressor, a switch in control of the circuit for said motor and responsive to a temperature produced by said evaporator, means in the circuit of said motor and responsive to an overload therein for opening said circuit, a freezer compartment associated with said evaporator to be chilled thereby an agitator in said freezer compartment, a freezer motor for operating said agitator, means for controlling said freezer motor comprising a second switch in control of the circuit therefor and means rendered operable by said second switch while it is in closed circuit position for retaining said first motor energized regardless of the temperature produced by said evaporator except upon an overload in the circuit thereof, said means rendered operable by said second switch comprising a shunt circuit through said second switch and shunting the first switch.

18. In a refrigerating system, a refrigerant compressor, a motor for driving said compressor, an evaporator cooled by said compressor, a switch in control of the circuit for said motor and responsive to a temperature produced by said evaporator, a freezer compartment associated with said evaporator to be chilled thereby, an agitator in said freezer compartment, a freezer motor for operating said agitator, means for controlling said freezer motor comprising a second switch in control of the circuit therefor, means in the circuit of said freezer motor and responsive to an overload therein for opening the freezer motor circuit and means rendered operable by said second switch while it is in closed circuit position only for retaining said first motor energized regardless of the temperature produced by said evaporator, said means rendered operable by said second switch comprising a shunt circuit through said second switch and shunting the first switch.

19. In a refrigerating system, a refrigerant compressor, a motor for driving said compressor, an evaporator cooled by said compressor, a switch in control of the circuit for said motor and responsive to a temperature produced by said evaporator, means responsive to the high side pressure of said refrigerant compressor for opening the circuit of said motor upon excess pressure being generated, a freezer compartment associated with said evaporator to be chilled thereby, an agitator in said freezer compartment, a freezer motor for operating said agitator, means for controlling said freezer motor comprising a second switch in control of the circuit therefor and means rendered operable by said second switch while it is in closed circuit position for retaining said first motor energized regardless of the temperature produced by said evaporator except upon the generation of excess pressure in the high side of the refrigerant compressor, said means rendered operable by said second switch comprising a shunt circuit through said second switch and shunting the first switch.

20. In a refrigerating system, a refrigerant compressor, a motor for driving said compressor, an evaporator cooled by said compressor, a switch in control of the circuit for said motor and responsive to a temperature produced by said evaporator, means in the circuit of said motor and responsive to an overload therein for opening said circuit, a freezer compartment associated with said evaporator to be chilled thereby, an agitator in said freezer compartment, a freezer motor for operating said agitator, means for controlling said freezer motor comprising a second switch in control of the circuit therefor, means in the circuit of said freezer motor and responsive to an overload therein for opening the freezer motor circuit and means rendered operable by said second switch while it is in closed circuit position only for retaining said first motor energized regardless of the temperature produced by said evaporator except upon an overload in the circuit thereof, said means rendered operable by said second switch comprising a shunt circuit through said second switch and shunting the first switch.

21. In a refrigerating system, a refrigerant compressor, a motor for driving said compressor, an evaporator cooled by said compressor, a switch in control of the circuit for said motor and responsive to a temperature produced by said evaporator, means in the circuit of said motor and responsive to an overload therein for opening said circuit, means responsive to the high side pressure of said refrigerant compressor for opening the circuit of said motor upon excess pressure being generated, a freezer compartment associated with said evaporator to be chilled thereby, an agitator in said freezer compartment, a freezer motor for operating said agitator, means for controlling said freezer motor comprising a second switch in control of the circuit therefor and means rendered operable by said second switch while it is in closed circuit position for retaining said first motor energized regardless of the temperature produced by said evaporator except upon an overload in the circuit thereof and except upon the generation of excess pressure in the high side of the refrigerant compressor, said means rendered operable by said second switch comprising a shunt circuit through said second switch and shunting the first switch.

22. In a refrigerating system, a refrigerant compressor, a motor for driving said compressor, an evaporator cooled by said compressor, a switch in control of the circuit for said motor and responsive to a temperature produced by said evaporator, means responsive to the high side pressure of said refrigerant compressor for opening the circuit of said motor upon excess pressure being generated, a freezer compartment associated with said evaporator to be chilled thereby, an agitator in said freezer compartment, a freezer motor for operating said agitator, means for controlling said freezer motor comprising a second switch in control of the circuit therefor, means in the circuit of said freezer motor and responsive to an overload therein for opening the freezer motor circuit and means rendered operable by said second switch while it is in closed circuit position only for retaining said first motor energized regardless of the temperature produced by said evaporator except upon the generation of excess pressure in the high side of the refrigerant compressor, said means rendered operable by said second switch comprising a shunt circuit through said second switch and shunting the first switch.

BURTON E. SHAW.